(12) United States Patent
Tang

(10) Patent No.: US 9,244,299 B2
(45) Date of Patent: Jan. 26, 2016

(54) BACKLIGHT MODULE OF DISPLAY DEVICE

(75) Inventor: Guofu Tang, Guangdong (CN)

(73) Assignee: SHENZHEN CHINA STAR OPTOELECTRONICS TECHNOLOGY CO., LTD., Shenzhen, Guangdong (CN)

(*) Notice: Subject to any disclaimer, the term of this patent is extended or adjusted under 35 U.S.C. 154(b) by 766 days.

(21) Appl. No.: 13/381,935

(22) PCT Filed: Nov. 25, 2011

(86) PCT No.: PCT/CN2011/082908
§ 371 (c)(1),
(2), (4) Date: Dec. 31, 2011

(87) PCT Pub. No.: WO2013/075323
PCT Pub. Date: May 30, 2013

(65) Prior Publication Data
US 2013/0128613 A1    May 23, 2013

(30) Foreign Application Priority Data

Nov. 22, 2011  (CN) .......................... 2011 1 0373445

(51) Int. Cl.
*F21V 7/04* (2006.01)
*G02F 1/1333* (2006.01)
*F21V 8/00* (2006.01)

(52) U.S. Cl.
CPC ........ *G02F 1/133308* (2013.01); *G02B 6/0021* (2013.01); *G02B 6/0023* (2013.01);
(Continued)

(58) Field of Classification Search
CPC .. G02B 6/0023; G02B 6/0021; G02B 6/0031; G02B 6/0055; G02B 6/0091; G02F 2001/133317; G02F 1/133308

USPC .......................................................... 362/623
See application file for complete search history.

(56) References Cited

U.S. PATENT DOCUMENTS 5,280,372 A * 1/1994 Horiuchi ......................... 349/65
7,193,248 B2 * 3/2007 Weindorf et al. ............. 257/100
(Continued)

FOREIGN PATENT DOCUMENTS

CN            1877417 A    12/2006
CN          101089700 A    12/2007
(Continued)

*Primary Examiner* — Mary McManmon
(74) *Attorney, Agent, or Firm* — Cheng-Ju Chiang

(57) ABSTRACT

The present invention provides a backlight module of display device, which includes: a back panel, a reflection hood arranged on the back panel, a backlight source arranged on the reflection hood, a reflector board arranged on the back panel, a light guide plate arranged on the reflector board, and a plastic frame coupled to the back panel and the light guide plate. Light emitting from the backlight source is reflected by the reflection hood into the light guide plate. The reflection hood includes a reflection section, an abutment section connected to the reflection section, and a bearing section connected to the abutment section. The abutment section is positioned against the back panel. The backlight source is mounted on the bearing section. The bearing section is positioned on the back panel. The backlight module of display device according to the present invention provides a light reflection hood to replace manual mounting of reflection surface thereby eliminating the yield problem caused by manual mounting operation and ensuring completeness of light reflection of the backlight source and thus ensuring light emission efficiency of the light guide plate while improving heat transfer performance of the backlight source.

7 Claims, 2 Drawing Sheets

(52) U.S. Cl.
CPC ............ *G02B6/0031* (2013.01); *G02B 6/0055* (2013.01); *G02B 6/0091* (2013.01); *G02F 2001/133317* (2013.01)

(56) References Cited

U.S. PATENT DOCUMENTS 7,585,098 B2 * 9/2009 Mikami .................. 362/608
2003/0189821 A1 * 10/2003 Moon ....................... 362/31
2004/0070966 A1 * 4/2004 Ahn et al. ................. 362/31
2007/0030696 A1 * 2/2007 Lv et al. .................. 362/615
2009/0168405 A1 * 7/2009 Yoo et al. ................. 362/97.2

FOREIGN PATENT DOCUMENTS

CN      201060349 Y     5/2008
CN      201152917 Y     11/2008

* cited by examiner

BACKLIGHT MODULE OF DISPLAY DEVICE

BACKGROUND OF THE INVENTION

1. Field of the Invention

The present invention relates to a backlight module of display device, and in particular to a backlight module of a display device that ensures completeness of reflected light and also improves heat conduction performance of backlight source.

2. The Related Arts

An LED (Light-Emitting Diode) backlight module is generally classified as two types according to the position of light source, namely direct type and edge type. In backlighting of direct type, the light source is located exactly below an LCD (Liquid Crystal Display) panel for direct irradiation. Since it is possible to use a large number of light tubes, extremely high brightness can be realized. However, the cost is high and this makes generally available for TV modules that require great brightness. Backlighting of edge type positions a light source at an edge of a light guide plate and light from the light source is guided into the interior of the light guide plate to be subjected to total reflection by a reflection surface and refraction caused by grid spots on a bottom of the light guide plate in order to emit from a top surface of the light guide plate to serve as a planar light source of homogenous brightness for the LCD panel.

The state-of-the-art edge type backlighting comprises a planar mirror that is directly mounted to a plastic frame or a back panel and the commonly adopted way is to mount manually. Manually mounting may cause a problem in yield rate, and thus affecting reflection of LED light and lowering light emission efficiency.

Further, heat dissipation is another issue of backlight modules that requires constant improvement.

SUMMARY OF THE INVENTION

Thus, an objective of the present invention is to provide a backlight module of display device that has a simple structure and ensures luminous intensity of light guide plate and at the same time improves heat transfer efficiency of backlight source.

To achieve the objective, the present invention provides a backlight module of display device, comprising: a back panel, a reflection hood arranged on the back panel, a backlight source arranged on the reflection hood, a reflector board arranged on the back panel, a light guide plate arranged on the reflector board, and a plastic frame coupled to the back panel and the light guide plate, light emitting from the backlight source being reflected by the reflection hood into the light guide plate, the reflection hood comprising a reflection section, an abutment section connected to one side of the reflection section, and a bearing section connected to one side of the abutment section that is distant from the reflection section, the abutment section being positioned against the back panel, the backlight source being mounted on the bearing section, the bearing section being positioned on the back panel.

The reflection hood further comprises a retention section connected to one side of the reflection section that is distant from the abutment section, the retention section having a free end distant from the reflection section and forming a plurality of positioning sections.

The plastic frame forms, on a side thereof facing the light guide plate, a support surface, the reflection section being positioned against the support surface.

The plastic frame forms, on the side thereof facing the light guide plate, a holding surface connected to the support surface and a plurality of positioning slots formed in the holding surface, the retention section being set against the holding surface, the positioning sections of the reflection hood being respectively received in the positioning slots.

The back panel has a bottom surface at a location corresponding to the reflection hood and a side surface that is connected perpendicular to the bottom surface, the abutment section of the reflection hood being arranged perpendicular to the bearing section, the abutment section being positioned against the side surface of the back panel, the bearing section being positioned on the bottom surface of the back panel.

The reflection section comprises an abutment surface and a reflection surface, the abutment surface being positioned against the support surface of the plastic frame, the reflection surface comprising a single inclined surface, multiple inclined surfaces, or a curved surface.

The reflection hood is made of mirror-surface aluminum material, mirror-surface copper, or composite material, the composite material comprising a reflective plastic plate and a metal base material attached to the reflective plastic plate.

The bearing section or the abutment section is fixed to the back panel.

The bearing section or the abutment section is fixed to the back panel by screws or adhesive tapes.

The backlight source comprises an LED light strip.

The efficacy of the present invention is that the backlight module of display device according to the present invention provides a light reflection hood to replace manual mounting of reflection surface thereby eliminating the yield problem caused by manual mounting operation and ensuring completeness of light reflection of the backlight source and thus ensuring light emission efficiency of the light guide plate while improving heat transfer performance of the backlight source.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as other beneficial advantages, will be apparent from the following detailed description of an embodiment of the present invention, with reference to the attached drawings. In the drawings.

DETAILED DESCRIPTION OF THE PREFERRED EMBODIMENT

To further expound the technical solution adopted in the present invention and the advantages thereof, a detailed description is given to a preferred embodiment of the present invention and the attached drawings.

Figure 1:
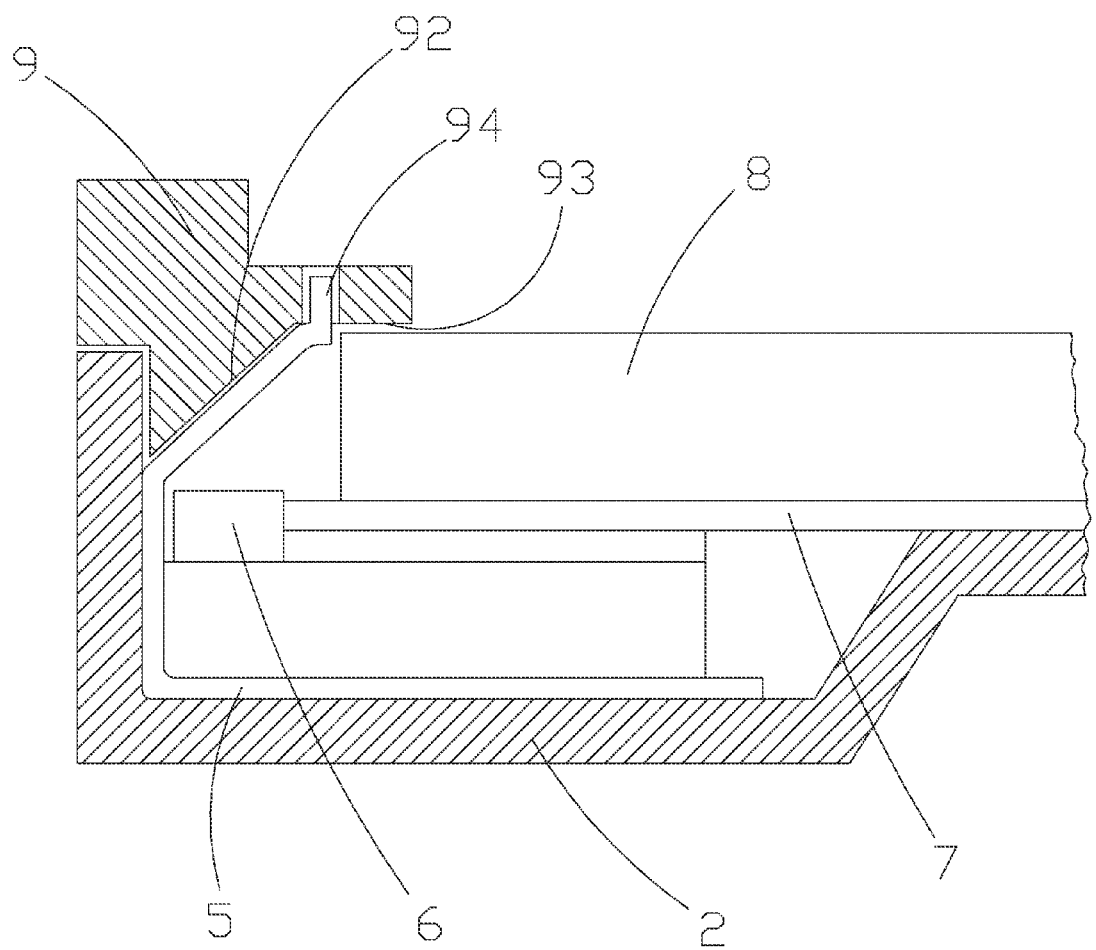
FIG. 1 is a cross-sectional view of a portion of a backlight module of display device according to the present invention in an assembled form.
Figure 2:
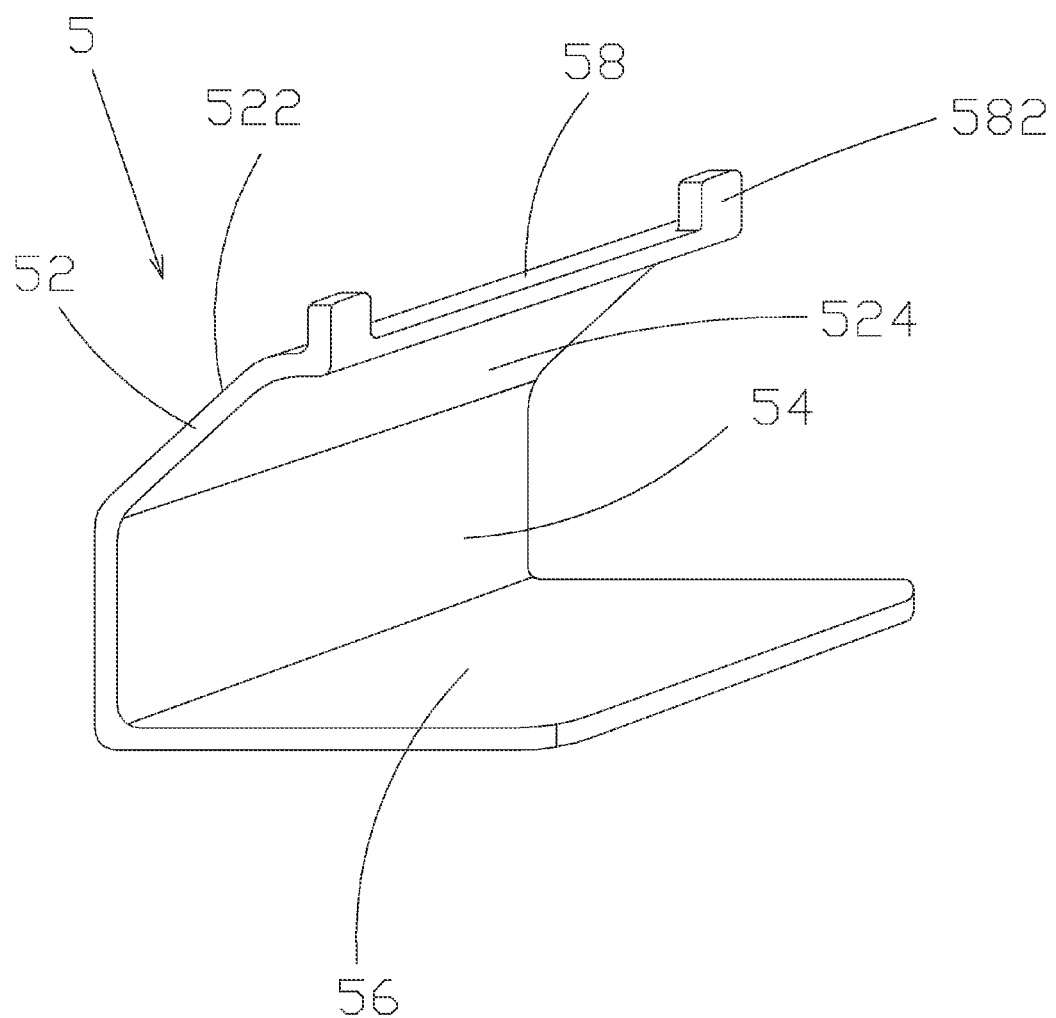
FIG. 2 is a schematic perspective view illustrating a reflection hood of the backlight module of display device according to the present invention.

Referring to FIGS. 1 and 2, the present invention provides a backlight module of display device, which comprises: a back panel 2, a reflection hood 5 arranged on the back panel, a backlight source 6 arranged on the reflection hood 5, a reflector board 7 arranged on the back panel 2, a light guide plate 8 arranged on the reflector board 7, and a plastic frame 9 coupled to the back panel 2 and the light guide plate 8. The backlight source 6 used in the present invention is an LED (Light-Emitting Diode) light strip. Light emitting from the backlight source 6 is reflected by the reflection hood 5 into the light guide plate 8 so as to provide sufficient irradiation of light to the light guide plate 8.

The back panel 2 has a bottom surface 22 at a location corresponding to the reflection hood 5 and a side surface 24 that is connected perpendicular to the bottom surface 22.

The reflection hood 5 comprises a reflection section 52, an abutment section 54 connected to one side of the reflection section 52, a bearing section 56 connected to one side of the abutment section 54 that is distant from the reflection section 52, and a retention section 58 connected to one side of the reflection section 52 that is distant from the abutment section. The retention section 58 has a free end that is distant from the reflection section 52 and forms two positioning sections 582, which are respectively located at two ends of the retention section 58 (see FIG. 2). The number of the positioning sections 582 can be varied as desired. The backlight source 6 is mounted on the bearing section 56. The reflection section 52 extends in an upward inclined direction from the abutment section 54 toward the light guide plate 8 and is located above the backlight source 6. The reflection section 52 comprises an abutment surface 522 and a reflection surface 524. The reflection surface 524 can be a single inclined surface, multiple inclined surfaces, or a curved surface and is arranged to oppose the backlight source 6 in order to completely reflect the light emitting from the backlight source 6 toward the light guide plate 8. The abutment section 54 is arranged perpendicular to the bearing section 56. The abutment section 54 is positioned against the side surface 24 of the back panel 2. The bearing section 56 is positioned on the bottom surface 22 of the back panel 2. The reflection hood 5 is fixed to the back panel 2 through the bearing section 56 or the abutment section 54 and the fixing can be done with screw fastening or adhesives.

The plastic frame 9 forms, on the side thereof facing the light guide plate 8, a support surface 92, a holding surface 93 connected to the support surface 92, and a plurality of positioning slots 94 formed in the holding surface 93. The abutment surface 522 of the reflection section 52 of the reflection hood 5 is positioned against the support surface 92. The retention section 58 is set against the holding surface 93, and the positioning sections 582 of the reflection hood 5 are respectively received in the positioning slots 94 to prevent the reflection section 52 from deformation so as to ensure completeness of light reflection and thus ensure the light emission rate of the light guide plate 8.

The reflection hood 5 is made of mirror-surface aluminum material, mirror-surface copper, or composite material. The composite material may comprise a reflective plastic plate and a metal base material attached to the reflective plastic plate. The backlight source 6 is set in direct contact with the reflection hood 5, whereby the excellent property of heat conductivity of the metal material included in the light reflection hood 5 can be fully used to increase heat transfer efficiency so as to improve the heat transfer performance of the backlight source.

In the backlight module of display device provided in the present invention, light emitting from the backlight source 6 is partly incident into the light guide plate 8, and another part is reflected by the reflection hood 5 to transmit into the light guide plate 8, thereby increasing the light intensity entering the light guide plate 8 and improving overall backlighting brightness.

In summary, the backlight module of display device according to the present invention provides a light reflection hood to replace manual mounting of reflection surface thereby eliminating the yield problem caused by manual mounting operation and ensuring completeness of light reflection of the backlight source and thus ensuring light emission efficiency of the light guide plate while improving heat transfer performance of the backlight source.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module of a display device, comprising a back panel comprising a bottom surface and a side surface connected to and perpendicular to the bottom surface, a reflection hood arranged on the back panel, a backlight source arranged on the reflection hood, a reflector board arranged on the back panel, a light guide plate arranged on the reflector board, and a plastic frame coupled to the back panel and the light guide plate, light emitting from the backlight source being reflected by the reflection hood into the light guide plate, the reflection hood comprising a reflection section, an abutment section connected to one side of the reflection section, and a bearing section connected to one side of the abutment section that is distant from the reflection section, the abutment section being positioned against and in contact engagement with the side surface of the back panel, the backlight source being mounted on the bearing section, the bearing section being positioned against and in contact engagement with the bottom surface of the back panel;

wherein the reflection hood further comprises a retention section connected to one side of the reflection section that is distant from and opposite to the abutment section to set the retention section opposite to the abutment section and also set the retention section opposite to the bearing section so as to keep the abutment section and the bearing section in contact engagement with the side surface and the bottom surface of the back panel respectively, the retention section having a free end distant from the reflection section and forming a plurality of positioning sections, the positioning sections and the abutment section being arranged at opposite sides of the reflection section; and wherein the plastic frame forms, on a side thereof facing the light guide plate and the bottom surface of the back panel, a holding surface and a plurality of positioning slots formed in the holding surface, the retention section being set against the holding surface, the positioning sections of the reflection hood being respectively received in the positioning slots and opposite to the side surface of the back panel and the positioning sections so received in the positioning slots being opposite to the abutment section and the bearing section, wherein with the positioning sections received in the positioning slots of the plastic frame and the abutment section positioned against and in contact engagement with the back panel and further with the plastic frame being coupled to the back panel, the reflection section is retained in position and prevented from deformation by the positioning sections and the abutment section arranged at the opposite sides of the reflection section.

2. The backlight module of a display device as claimed in claim 1, wherein the plastic frame forms, on the side thereof facing the light guide plate, a support surface, the reflection section being positioned against the support surface.

3. The backlight module of a display device as claimed in claim 2, wherein the holding surface of the plastic frame is connected to the support surface, the retention section of the reflection hood being set against the holding surface to allow the positioning sections of the reflection hood to be respectively received in the positioning slots of the plastic frame.

4. The backlight module of a display device as claimed in claim 2, wherein the reflection section comprises an abutment surface and a reflection surface, the abutment surface being positioned against the support surface of the plastic frame, the reflection surface comprising a single inclined surface, multiple inclined surfaces, or a curved surface.

5. The backlight module of a display device as claimed in claim 1, wherein the reflection hood is made of mirror-surface aluminum material, mirror-surface copper, or composite material, the composite material comprising a reflective plastic plate and a metal base material attached to the reflective plastic plate.

6. The backlight module of a display device as claimed in claim 1, wherein one of the bearing section and the abutment section of the reflection hood is fixed to the back panel by screws or adhesive tapes.

7. The backlight module of a display device as claimed in claim 1, wherein the backlight source comprises an LED (Light-Emitting Diode) light strip.

* * * * *